May 15, 1923.
C. KRUSE
HYDRAULIC TRANSMISSION
Filed Oct. 17, 1921
1,455,295
2 Sheets-Sheet 1
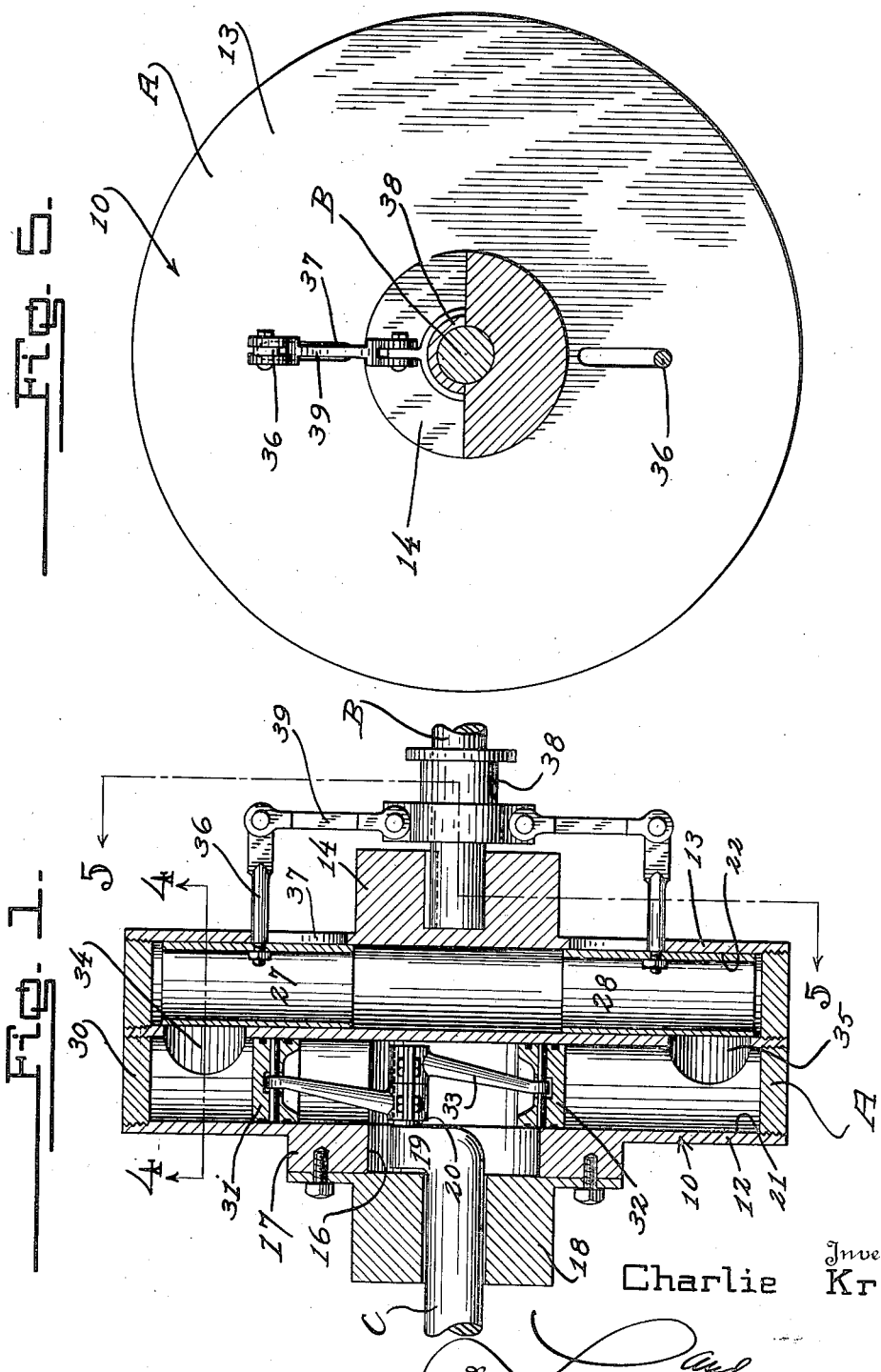
Inventor
Charlie Kruse
By Lancaster and Allwine
Attorneys

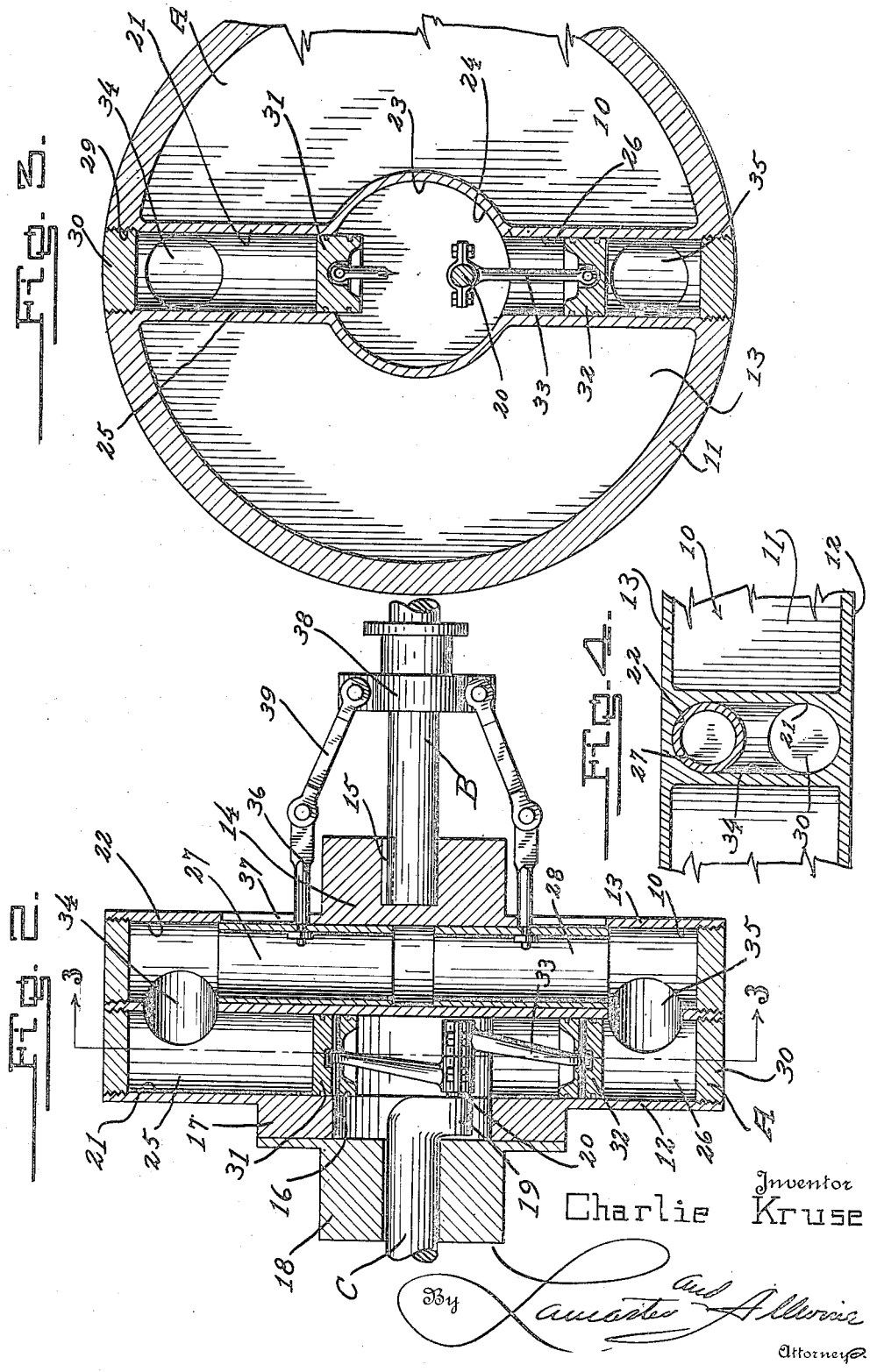

Patented May 15, 1923.

1,455,295

UNITED STATES PATENT OFFICE.

CHARLIE KRUSE, OF SAN LUIS OBISPO, CALIFORNIA.

HYDRAULIC TRANSMISSION.

Application filed October 17, 1921. Serial No. 508,222.

*To all whom it may concern:*

Be it known that I, CHARLIE KRUSE, a citizen of the United States, residing at San Luis Obispo, in the county of San Luis Obispo and State of California, have invented certain new and useful Improvements in Hydraulic Transmissions, of which the following is a specification.

This invention relates to speed transmission mechanism, and the primary object of the present invention is to provide a speed transmission in which an infinite number of different speed ratios may be obtained so as to permit the exact desired speed ratio for different loads to be obtained, said speed transmission eliminating the necessity of gears or other complicated mechanism, which would be subject to breakage or great wear.

Another object of the invention is to provide a hydraulic or "oil" transmission embodying a drive and a driven shaft, a fly wheel connected to one of the shafts having a plurality of cylinders therein for the reception of pistons, means connecting the pistons with the other shaft and a connecting valve controlled by-pass for the ends of the cylinders.

Another object of the invention is the arrangement of the by-pass in relation to the cylinders and ports connecting the by-pass with the cylinders, and the novelly arranged slide valves for controlling the size of said ports, whereby the various speed ratios can be obtained.

Another object of the invention is to provide an improved hydraulic or "oil" transmission of the above character, which will be durable and efficient in use, one that will be simple and easy to manufacture, and one which can be placed upon the market at a reasonable cost, and operated with the ordinary type of drive and driven shafts of power operated devices.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a diametric section through the improved hydraulic or "oil" transmission.

Figure 2 is a similar section showing the slide valves actuated so as to allow the free unimpeded movement of the oil or other fluid from one cylinder to the other, thereby permitting the driven shaft to remain idle during the rotation of the drive shaft.

Figure 3 is a section through the improved transmission taken on the line 3—3 of Figure 2.

Figure 4 is a fragmentary section taken on the line 4—4 of Figure 1.

Figure 5 is a section taken on the line 5—5 of Figure 1.

Referring to the drawings in detail, wherein similar reference characters designate corresponding parts throughout the several views, the letter A indicates the fly wheel; B, a drive shaft; and C, a driven shaft.

In the application of this invention, it is immaterial whether the fly wheel is keyed to the drive shaft or to the driven shaft, but it has been found that the best results can be obtained by keying the flywheel direct to the drive shaft, and in the drawing, this has been shown in this way.

The fly wheel A can be constructed in the desired size and mass and of the desired material, and comprises a circular body 10 having an annular rim 11 and the connecting and closing side plates 12 and 13. The wall 13 has formed thereon the hub or axial enlargement 14, which has keyed or otherwise secured thereto, as at 15, the drive shaft B. The side plate 12 is provided with an axial relatively large opening 16, which is surrounded by an annular rib 17. This rib 17 has detachably secured thereto a bearing or hub 18 for the rotatable driven shaft C, which extends into the opening 16. This driven shaft C is provided with a crank 19 and the end of the crank has secured to or formed thereon the crank pin 20. The fly wheel A is provided with a diametrically extending cylindrical way 21 and a diametrically extending way 22. These ways are disposed in parallel relation. The central portion of the way 21 is enlarged to provide a circular chamber 23, and forms a crank case for the crank pin 20. This chamber 23 defines the substantially circular wall 24 and radially extending cylinders 25 and 26. The way 22 constitutes the valve housing and a pair of slide valves 27 and 28 are mounted within the way 22. The slide valves 27 and 28 are of hollow construction and their cross sectional configuration conforms to the cross sectional configuration of the way 22.

Means is provided whereby the valves 27 and 28 are adapted to move toward and away from each other. The ways 21 and 22 have their terminals threaded as at 29 for the reception of removable plugs 30 which completely close these ways. The cylinders 25 and 26 defined by the annular crank case 24 have mounted therein pistons 31 and 32, which are connected by means of connecting rods 33 with the crank pin 20. As shown, the ends of the connecting rods 33 are pivotally connected to the pistons 31 and 32 and rotatably connected to the crank pin 20. The cylinders 25 and 26 are connected adjacent to their outer ends with the way 22 by ports 34 and 35. These ports 34 and 35 have a diameter equal to or greater than the cylinders 25 and 26. The slide valves 27 and 28 are adapted to control the flow of oil or other fluid through the ports and it is obvious that by moving the valves toward and away from the ports, the size of these ports can be controlled. The valves 27 and 28 have detachably secured thereto intermediate their ends, the arms 36 which extend outwardly through slots 37 in the circular end wall 13. These arms 36 are connected with the slide ring 38 by means of connecting links 39. The slide ring 38 is feathered to and slidably mounted on the drive shaft B. By moving the slide ring 38 on the drive shaft B, the valves 27 and 28 can be moved toward and away from the ports 34 and 35. The slide ring 38 is adapted to have connected thereto any suitable type of yoke and operating lever (not shown).

When the slide valves 27 and 28 are moved toward each other so as to fully open the ports 34 and 35 no movement will be imparted to the driven shaft C from the drive shaft B. Upon rotation of the drive shaft B and the consequent rotation of the fly wheel A, the pistons 25 and 26 will have no resisting surface to act against, as the oil or other fluid in the cylinders and the way 22 will simply flow from one cylinder to the other. Thus, the pistons will reciprocate freely in the cylinders and the driven shaft C will not be rotated. Thus it can be seen that when it is desired to let the driven shaft C remain idle during rotation of the drive shaft B, the valves 27 and 28 are moved to fully open position.

Now, when it is desired to rotate the driven shaft C and to let the drive shaft B assume the load, the collar 38 is gradually forced inwardly which will move the slide valves 27 and 28 outwardly in opposite directions and slowly close the ports 34 and 35. This will set up a resistance to the oil or other fluid flowing from one cylinder to the other and thus permit a resisting surface for the pistons to act upon, which will permit the operation of the driven shaft C. It is obvious that the smaller the size of the ports 34 and 35 the more resistance the oil or other fluid will be subjected to and consequently more resistance surface will be offered to the pistons and the faster the driven shaft C will be rotated.

When the slide valves 27 and 28 are in their fully extended positions, the ports 34 and 35 will be fully closed as shown in Figure 1 of the drawings, and thus the oil or other fluid will be entrapped in the cylinders 25 and 26 and during the rotation of the fly wheel the same will not be permitted to escape, thus preventing any movement of the pistons 31 and 32 and thus giving a direct drive from the drive shaft B to the driven shaft C, which of course constitutes high speed.

Owing to the fact that a fine adjustment can be given to the slide valves 27 and 28, it can be seen that an infinite number of speed ratios can be had and thus a speed ratio, which is best suited for the load can be obtained.

The arrangement of the cylindrical way 21 which constitutes the pistons 25 and 26 in relation to the cylindrical way 22 which constitutes the slide valve casing and the relation of the slide valves to the ports forms an exceptionally simple and compact structure and entirely eliminates the necessity of filling the entire fly wheel with oil or other fluid such as contemplated in other structures along the same line.

Changes in details may be made without departing from the spirit or scope of this invention; but,

I claim:

1. In a fluid transmission, a drive shaft, a driven shaft, a fly wheel carried by one of the shafts, a crank carried by the other shaft, cylindrical ways extending through the wheel, ports connecting the ends of the ways together, pistons slidably mounted in one of the ways, means connecting the pistons with the crank, and slide valves mounted in the other way for movement toward and away from said ports for controlling the size of said ports.

2. A speed transmission comprising a drive shaft and a driven shaft, a fly wheel keyed to one of the shafts, a crank carried by the other shaft and disposed within the fly wheel, radially extending cylinders disposed in and carried by the fly wheel, pistons reciprocably mounted in the cylinders and operatively connected with the crank, a diametrically extending way formed in the fly wheel of substantially the same diameter as the cylinders, ports connecting the outer ends of the cylinders with the way, said ports being of substantially the same diameter as the cylinders and way, hollow slide valves mounted in the way for movement toward and away from the ports and actuating means for said slide valves disposed exteriorly of the fly wheel.

3. A hydraulic transmission comprising a drive and a driven shaft, a fly wheel keyed to one of said shafts including a rim and circular side plates, a diametrically extending way formed in the fly wheel defining a pair of cylinders, a second diametrically extending way formed in the fly wheel disposed in parallel relation with the first mentioned way, ports connecting the outer ends of the ways together, pistons mounted for sliding movement in the cylinders defined by the first mentioned way, a crank extension formed on the other shaft, means operatively connecting the crank with the pistons, removable plugs for the ends of said ways extending flush with the periphery of the rim, hollow slide valves mounted in the second mentioned way for movement toward and away from said ports, the cylinders on the opposite sides of the pistons and the second mentioned way having fluid therein, and means for simultaneously operating said hollow slide valves toward and away from each other.

4. A hydraulic speed transmission comprising a drive shaft, a driven shaft, a fly wheel keyed to said drive shaft, a diametrically extending way formed within the fly wheel defining a pair of cylinders, a crank extension formed on the driven shaft and extending into said fly wheel, pistons operatively connected to said crank and slidably mounted within the cylinders defined by said way, a second way diametrically disposed within the fly wheel and arranged in parallel relation with the first mentioned way, ports connecting the outer ends of the ways together, hollow slide valves mounted in the second mentioned way for movement toward and away from said ports, the fly wheel having guide slots formed therein normally closed by said slide valves, outwardly extending operating arms rigidly secured to the slide valves and slidably mounted in said guide slots, an adjusting ring slidably mounted upon the drive shaft and connecting links pivotally secured to the operating arms and to said adjusting ring.

CHARLIE KRUSE.